Patented May 4, 1926.

1,582,940

UNITED STATES PATENT OFFICE.

LUDWIG TAUB, HERMANN JANSSEN, AND GEORG WESENBERG, OF ELBERFELD, GERMANY, ASSIGNORS, BY MESNE ASSIGNMENTS, TO WINTHROP CHEMICAL COMPANY, INC., OF NEW YORK, N. Y., A CORPORATION OF NEW YORK.

SILVER-PROTEIN PREPARATION.

No Drawing. Application filed July 11, 1922. Serial No. 574,266.

*To all whom it may concern:*

Be it known that we, LUDWIG TAUB, HERMANN JANSSEN, and GEORG WESENBERG, citizens of Germany, residing at Elberfeld, Germany, have invented new and useful Improvements in Silver-Protein Preparations, of which the following is a specification.

We have found that new and valuable stable and solid protein silver preparations can be obtained by treating the known soluble silver protein compounds (see United States Letters Patent No. 615,970) with a soluble salt of an acid which does not give an insoluble or difficultly soluble silver salt, such as sodium acetate, the potassium, zinc or aluminium salts of phenylethylacetic acid, phenyldiethylacetic acid, benzoic acid, para-toluene-sulfonic acid, tartaric acid, citric acid, boric acid. The new products thus obtained possess the preference to the known soluble silver protein compounds above mentioned that they are quickly soluble in secretions and liquids, e. g. water. They have proved to be of good use in preparing tablets from which solutions (e. g. in water) of any desired concentration can be made and for preparing bougies being valuable prophylactics and remedies against gonorrhea.

In order to illustrate the invention more fully the following example is given, the parts being by weight:—

One part of the protein silver compound prepared in accordance with the example given in United States Letters Patent No. 615,970 is intimately mixed with 9 parts of borax. From the resulting product bougies or tablets are pressed.

Another silver compound mentioned or another of the above mentioned salts can be used.

We claim:—

1. The herein described silver protein preparations comprising a soluble silver protein compound mixed with a soluble salt of an acid which does not give an insoluble or difficultly soluble silver salt, being solid stable products quickly soluble in water and secretions and being valuable prophylactics and remedies against gonorrhea, substantially as described.

2. The herein described silver protein preparation, comprising a mixture of a soluble silver protein compound with borax, being a solid stable product quickly soluble in water and being a valuable prophylactic and remedy against gonorrhea, substantially as described.

3. As a new article of manufacture a preparation comprising a soluble salt of an acid which does not give an insoluble or difficultly soluble silver salt and a soluble silver protein product.

4. As a new article of manufacture a bougie comprising a soluble salt of an acid which does not give an insoluble or difficultly soluble silver salt and a soluble silver protein product.

In testimony whereof we have hereunto set our hands.

LUDWIG TAUB.
HERMANN JANSSEN.
GEORG WESENBERG.